US012328297B1

(12) United States Patent
Petrukhin et al.

(10) Patent No.: US 12,328,297 B1
(45) Date of Patent: *Jun. 10, 2025

(54) FILE SHARING OVER SECURE CONNECTIONS

(71) Applicant: PARALLELS INTERNATIONAL GmbH, Schaffhausen (CH)

(72) Inventors: Alexey Petrukhin, Tallinn (EE); Grigory Nikolaenko, Moscow (RU); Nikolay Dobrovolskiy, Moscow (RU); Serguei Beloussov, Singapore (SG)

(73) Assignee: Parallels International GmbH, Schaffhausen (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/767,276

(22) Filed: Jul. 9, 2024

Related U.S. Application Data

(63) Continuation of application No. 18/316,397, filed on May 12, 2023, now Pat. No. 12,034,699, which is a
(Continued)

(51) Int. Cl.
| | |
|---|---|
| G06F 21/00 | (2013.01) |
| G06F 11/14 | (2006.01) |
| H04L 9/40 | (2022.01) |
| H04L 67/01 | (2022.01) |
| H04L 67/06 | (2022.01) |

(Continued)

(52) U.S. Cl.
CPC ...... *H04L 63/0254* (2013.01); *G06F 11/1402* (2013.01); *H04L 63/0281* (2013.01);
(Continued)

(58) Field of Classification Search
CPC ..... H04L 63/0254; H04L 67/06; H04L 67/42; H04L 67/28; H04L 67/1097;
(Continued)

(56) References Cited

U.S. PATENT DOCUMENTS

| | | |
|---|---|---|
| 9,400,801 B1 | 7/2016 | Aplemakh et al. |
| 11,310,348 B2 * | 4/2022 | Stephure ................ H04L 67/02 |

(Continued)

FOREIGN PATENT DOCUMENTS

| | | | | |
|---|---|---|---|---|
| WO | WO-2024072577 A1 * | 4/2024 | ............ | G06F 16/119 |

OTHER PUBLICATIONS

Oracle, "Heartbeat Mechanism", 2010, Retrieved Apr. 1, 2021 from https://docs.oracle.com/cd/E19206-01/816-4178/6madjde6e/index.html.

*Primary Examiner* — Kendall Dolly
(74) *Attorney, Agent, or Firm* — Rosenberg, Klein & Lee

(57) ABSTRACT

Systems and methods for file sharing over secure connections. An example method comprises: receiving a client request identifying a file sharing host and a file residing on the file sharing host; establishing a secure client connection; responsive to identifying a management connection with the file sharing host, transmitting an identifier and a parameter of the secure client connection via the management connection; receiving a host request to establish a secure host connection, the host request comprising the identifier of the secure client connection; establishing the secure host connection using the parameter of the secure client connection identified by the received identifier; forwarding, over the secure host connection, a first data packet received over the secure client connection, the first data packet comprising at least part of the client request; and forwarding, over the secure client connection, a second data packet received over the secure host connection, the second data packet comprising at least part of the file identified by the client request.

4 Claims, 7 Drawing Sheets

Related U.S. Application Data continuation of application No. 17/459,122, filed on Aug. 27, 2021, now Pat. No. 11,677,718, which is a continuation of application No. 16/458,912, filed on Jul. 1, 2019, now Pat. No. 11,178,109, which is a continuation of application No. 15/056,435, filed on Feb. 29, 2016, now Pat. No. 10,404,663.

(51) Int. Cl.
  *H04L 67/1097* (2022.01)
  *H04L 67/56* (2022.01)

(52) U.S. Cl.
  CPC .......... *H04L 63/04* (2013.01); *H04L 63/061* (2013.01); *H04L 63/166* (2013.01); *H04L 67/01* (2022.05); *H04L 67/06* (2013.01); *H04L 67/1097* (2013.01); *H04L 67/56* (2022.05); *G06F 2201/805* (2013.01)

(58) Field of Classification Search
  CPC ... H04L 63/0281; H04L 63/04; H04L 63/166; H04L 63/061; G06F 11/1402; G06F 2201/805
  See application file for complete search history.

(56) References Cited

U.S. PATENT DOCUMENTS

| | | | |
|---|---|---|---|
| 2004/0003247 A1* | 1/2004 | Fraser | H04L 67/104 713/169 |
| 2005/0210072 A1* | 9/2005 | Bojinov | G06F 21/64 |
| 2010/0306286 A1* | 12/2010 | Chiu | H04L 67/1097 707/827 |
| 2012/0179737 A1 | 7/2012 | Baranov et al. | |
| 2012/0246226 A1* | 9/2012 | Anandam | H04L 67/06 709/203 |
| 2013/0282790 A1* | 10/2013 | Catmull | G06F 16/178 709/203 |
| 2014/0208311 A1* | 7/2014 | Yook | G06F 8/61 717/178 |
| 2016/0301774 A1 | 10/2016 | Dziezanowski et al. | |
| 2019/0361792 A1* | 11/2019 | Goldberg | G06F 16/178 |
| 2020/0356534 A1* | 11/2020 | R. | G06F 9/526 |
| 2021/0103598 A1* | 4/2021 | Pappanaickenpalayam Muthuswamy | G06F 16/178 |
| 2022/0035933 A1* | 2/2022 | Qiao | G06F 16/168 |
| 2023/0367833 A1* | 11/2023 | Kol | H04L 63/0227 |

\* cited by examiner

| 220 File ID | 230 File path | 240 File access rights | 250 File size | 260 Access limit | 270 Description |
|---|---|---|---|---|---|
| | | | | | |
| | | | | | |
| | | | | | |

| 320<br>Host ID | 330<br>Host login credentials | 340<br>Connection state | 350<br>Session key | 360<br>Host user information |
|---|---|---|---|---|
|  |  |  |  |  |
|  |  |  |  |  |
|  |  |  |  |  |

FIG. 3

FILE SHARING OVER SECURE CONNECTIONS

CROSS-REFERENCE TO RELATED APPLICATIONS

This application claims the benefit of priority as a continuation of U.S. patent application Ser. No. 18/316,397 filed May 12, 2023; which itself claims the benefit of priority from U.S. patent application Ser. No. 17/459,122 filed Aug. 27, 2021 which has issued as U.S. Pat. No. 11,677,718; which itself claims the benefit of priority as a continuation of U.S. patent Ser. No. 16/458,912 filed Jul. 1, 2019 which has issued as U.S. Pat. No. 11,178,109; which itself claims the benefit of priority from U.S. patent application Ser. No. 15/056,435 filed on Feb. 29, 2016; which issued as U.S. Pat. No. 10,404,663 on Sep. 3, 2019; the entire contents of each being incorporated herein by reference.

TECHNICAL FIELD

The present disclosure relates to file sharing, and more particularly, to systems and methods for file sharing over secure connections.

BACKGROUND

"Secure connection" herein shall refer to a stateful transport and/or session-level data transmission channel that provides privacy and data integrity for data transmission over computer networks. In an illustrative example, a secure connection may be provided by a Secure Socket Layer (SSL) connection. The SSL protocol employs public key cryptography for peer entity authentication and session key establishment, and further employs a session key for message authentication and data encryption. Establishing an SSL connection may involve a server providing its public key infrastructure (PKI) certificate to a client device requesting the respective connection. The PKI certificate may comprise an identifier of the server, an identifier of the issuing certificate authority, and a public key of the server. The requesting client device may optionally validate the received PKI certificate and then utilize the public key for negotiating an SSL session key that would then be used for encrypting and decrypting the messages flowing between the client device and the server.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates an example structure of the database 200 that may be employed for storing the metadata associated with the file sharing host file system objects, in accordance with one or more aspects of the present disclosure;

FIG. 3 schematically illustrates an example structure of the file sharing host information database that may be employed for storing the file sharing host information, in accordance with one or more aspects of the present disclosure;

DETAILED DESCRIPTION

Figure 1:
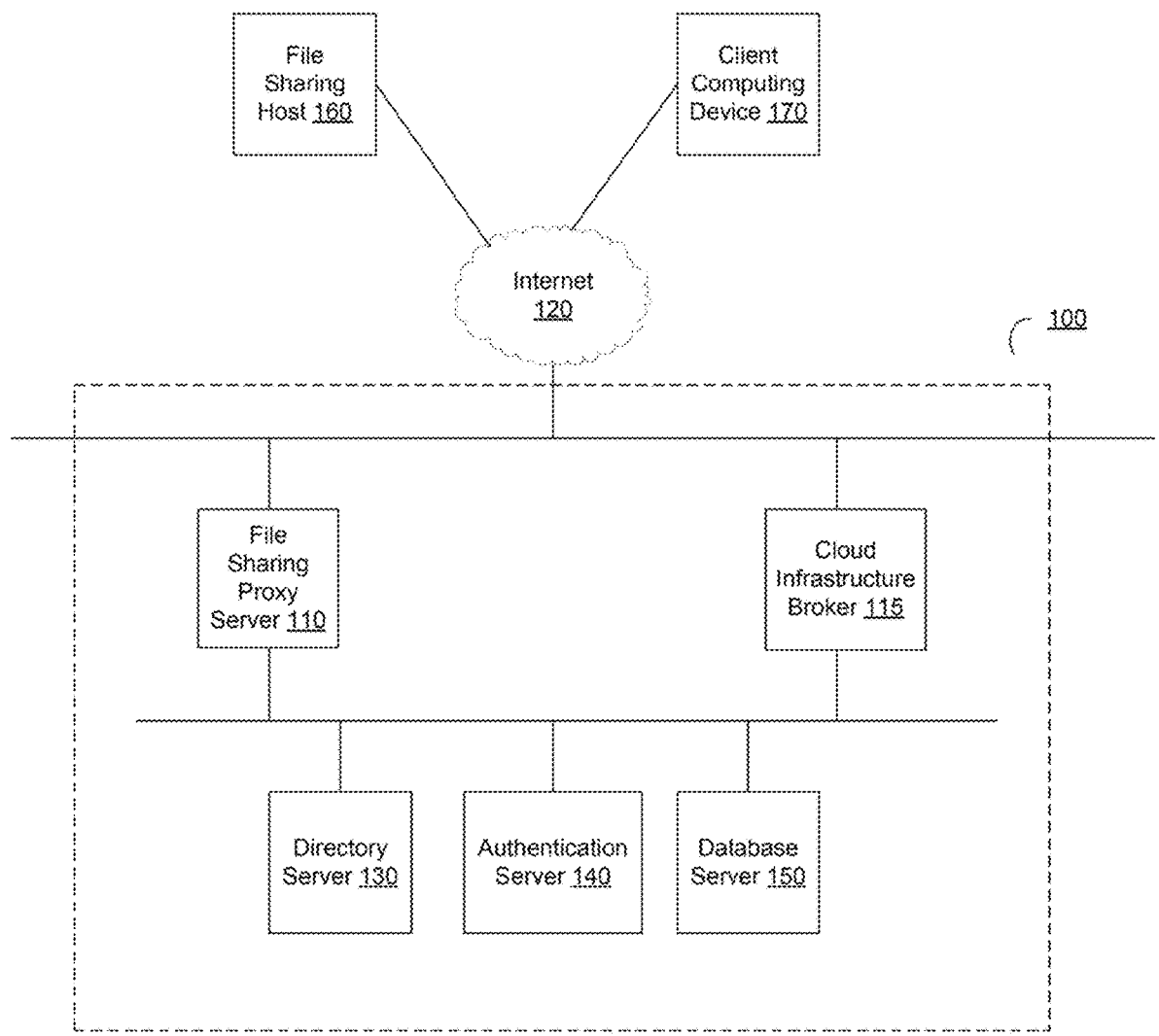
FIG. 1 depicts a high-level network diagram of an example cloud computing environment 100 in which the systems and methods for file sharing over secure connections may be implemented, in accordance with one or more aspects of the present disclosure.

Described herein are systems and methods for file sharing over secure connections.

"File sharing host" herein shall refer to a computing device employed for storing one or more files that may be accessed by one or more users of client computing devices. A file sharing host may be registered and/or otherwise pre-authenticated by an example cloud computing environment, as described in more details herein below. In certain implementations, a file sharing host may be controlled by a user who is entitled to use the file sharing services rendered by the example cloud computing environment. In various illustrative examples, a file sharing host may be provided by a mobile computing device (such as a smartphone), a personal computer, or by any other suitable computing device equipped with a network interface and a non-volatile storage device. Similarly, a client computing device may be provided by a mobile computing device (such as a smartphone), a personal computer, or by any other suitable computing device equipped with a network interface and a user interface (such as a graphical user interface).

An authorized user of a file sharing host may need to share one or more host files with one or more users of client computing devices. In embodiment illustrative example, the file sharing services may be initialized from the file sharing host, which may optionally be controlled via Remote Desktop protocol. The file sharing services may thus be limited to serving the files that have explicitly be designated by the file sharing host, using the respective hyperlinks, as described in more details herein below. In certain implementations, the file sharing services may not need any additional configuration, and thus the administrative access to the file sharing host may not be needed or may be specifically prohibited for reducing the potential attack footprint. Since the Internet connection of the file sharing host may inhibit incoming connections (e.g., the file sharing host may not have a public Internet Protocol (IP) address, or it may be protected by a firewall that bars incoming connections), establishing direct connections by client computing devices to the file sharing host may not always be feasible.

For facilitating data transmission between client computing devices and file sharing hosts, a file sharing proxy server may be provided for accepting incoming connections from both client computing devices and file sharing hosts. In order to allow the client computing devices to access certain file sharing host files while enforcing the file access security with respect to both the file sharing host and the file sharing clients, the file sharing host may establish a secure connection (e.g., an SSL connection) with the file sharing proxy server. The connection may be kept alive indefinitely or for at least a certain period of time, in anticipation of client requests for files residing in the file sharing host file system. A client computing device may, in turn, establish an SSL connection with the file sharing proxy server and transmit one or more file access requests (e.g., using one or more hyperlinks identifying the file system objects, such as files and/or directories). The two SSL connections may be utilized for transmitting data flows containing the files from the file sharing host to the file sharing proxy server, and then to the client computing device. That would require the file sharing proxy server to not only maintain two active SSL connections, but also to buffer the incoming data, track the transmitted portion of the buffered data, and perform other associated tasks. In order to improve the operational efficiency and scalability of the cloud infrastructure, the file sharing proxy server could "short circuit" the sockets associated with file sharing host and client connections, by writing to the socket associated with the client connection all data that has been read from the socket associated with the host connection, and vice versa. Since the data being transmitted over the two SSL connections may be encrypted using different session keys, the proxy would need to decrypt any incoming data and re-encrypt it before forwarding using the respective SSL session keys. Such decryption and encryption operations would only need to be performed because the file sharing host secure connection to the file sharing proxy server and the client secure connection to the file sharing proxy server utilize different encryption keys. Since the data being decrypted is not consumed by the file sharing proxy server in any useful way, such a scheme appears to be inherently inefficient with respect to the processing and memory resources of the file sharing proxy server.

The present disclosure addresses this and other deficiencies by providing systems and methods utilizing a file sharing proxy server for facilitating data transmission between client computing devices and file sharing hosts. In accordance with one or more aspects of the present disclosure, the file sharing proxy server may, responsive to receiving a client request, establish a secure client connection with the requesting client computing device. The file sharing proxy server may then transmit, over a previously established management connection to the file sharing host, one or more parameters of the secure client connection (e.g., the SSL session key which is used for encrypting the traffic flowing over the SSL connection and/or other elements of the SSL connection state). The file sharing host may utilize the received secure connection parameters, including the SSL session key for establishing a new SSL connection with the file sharing proxy server, thus enabling the existing client connection and the newly established host connection to share the SSL session key and/or other elements of the SSL connection state. Since the same SSL session key is shared by both client and host connections to the file sharing proxy server, the traffic flowing over both connections may be encrypted by the same encryption key, and the client computing device may decrypt the messages transmitted by the file sharing host, while the file sharing host may decrypt the messages transmitted by the client computing device, thus relieving the file sharing proxy server from the task of decrypting the data received over one connection and re-encrypting the data before forwarding it over another connection, as described in more details herein below. By relieving the file sharing proxy server from the task of decrypting and re-encrypting the data traffic between the client computing devices and the file sharing hosts, the efficiency with respect to the processing and memory resources of the file sharing proxy server is significantly improved. Various aspects of the above referenced methods and systems are described in detail herein below by way of examples, rather than by way of limitation.

FIG. 1 depicts a high-level network diagram of an example cloud computing environment 100 in which the systems and methods for file sharing over secure connections may be implemented, in accordance with one or more aspects of the present disclosure. As schematically illustrated by FIG. 1, the cloud computing environment 100 may comprise one or more file sharing proxy servers 110 employed to perform the methods of file sharing over secure connections in accordance with one or more aspects of the present disclosure. Each file sharing proxy server may be communicatively coupled to the Internet 120 via one or more routers, firewalls, load balancers, and/or other auxiliary components that are omitted from FIG. 1 for clarity.

The cloud computing environment 100 may further comprise one or more user directory servers 130 that may be employed to store information associated with the users of the cloud computing environment 100. In an illustrative example, a user directory server 130 may implement the Lightweight Directory Access Protocol (LDAP), however, other suitable user directory protocols are within the scope of this disclosure. While FIG. 1 illustrates the user directory servers 130 as being installed on dedicated hardware servers, a user directory server component 130 may alternatively be collocated with a file sharing proxy server 110 on a single hardware server.

The cloud computing environment 100 may further comprise one or more authentication servers 140 that may be employed to validate the user credentials. In an illustrative example, an authentication server 140 may implement Kerberos protocol, however, other suitable user directory protocols are within the scope of this disclosure. While FIG. 1 illustrates the authentication servers 140 as being installed on dedicated hardware servers, an authentication server component 140 may alternatively be collocated with a file sharing proxy server 110 on a single hardware server.

The cloud computing environment 100 may further comprise one or more database servers 150 that may be employed to store metadata associated with the files hosted by one or more file sharing hosts 160, as described in more details herein below. In an illustrative example, a database server 150 may be provided by a relational database server, however, other suitable database architectures are within the scope of this disclosure. While FIG. 1 illustrates the database servers 150 as being installed on dedicated hardware servers, a database server component 150 may alternatively be collocated with a file sharing proxy server 110 on a single hardware server.

The cloud computing environment 100 may further comprise one or more cloud infrastructure brokers 155 employed to coordinate the operation of various components of the example cloud computing environment 100. While FIG. 1 illustrates the cloud infrastructure brokers 155 as being installed on dedicated hardware servers, a cloud infrastructure broker 155 may alternatively be collocated with a file sharing proxy server 110 on a single hardware server. In certain implementations, the cloud computing environment 100 may further comprise various additional components which have been omitted from FIG. 1 for conciseness and clarity.

An authorized user of a file sharing host 160 may need to share one or more files and/or directories residing in the file sharing host file system with one or more users of client computing devices 170. As noted herein above, in various illustrative examples, a file sharing host may be provided by a mobile computing device (such as a smartphone), a personal computer, or by any other suitable computing device equipped with a network interface and a non-volatile storage device. Similarly, a client computing device may be provided by a mobile computing device (such as a smartphone), a personal computer, or by any other suitable computing device equipped with a network interface and a user interface (such as a graphical user interface).

The cloud infrastructure broker 155 may include a web server for providing a web interface to be consumed by browsers and/or web-enabled applications, including mobile applications, of client computing devices 170. In an illustrative example, responsive to authenticating a user of a client computing device 170, the cloud infrastructure broker 155 may generate a Hypertext Markup Language (HTML) page comprising hyperlinks to one or more files that reside on one or more file sharing hosts 160 and may be accessed by the client computing device 170. Each hyperlink may include a universal resource locator (URL) identifying a file sharing host and a file residing on a file system associated with the file sharing host. The file sharing host may be identified by a universally unique identifier (UUID). The file may be identified by a file name which may then be translated into the path to the file within the file sharing host file system, as described in more details herein below.

In certain implementations, a hyperlink may be temporarily associated with a file system object for a single session. Alternatively, a hyperlink may be permanently associated with a file system object for the file system object lifetime (i.e., until the file system object is destroyed), thus allowing the client computing device to locally store one or more hyperlinks and re-use such hyperlinks in subsequent sessions.

As noted herein above, the Internet connection of the file sharing host 160 may inhibit incoming connections (e.g., the file sharing host may not have a public Internet Protocol (IP) address, or it may be protected by a firewall that bars incoming connections). Furthermore, the file sharing host 160 may not necessarily be in the active operational mode at all times, as it may occasionally or regularly be powered off, and/or may occasionally or regularly operate in the sleeping mode. In accordance with one or more aspects of the present disclosure, file transfer (download and upload) operations with respect to the files residing on such a file sharing host may be facilitated by a file sharing proxy server 110 as an intermediary between a client 170 and a file sharing host 160, as described in more details herein below.

In certain implementations, the file sharing host 160 may maintain a database for storing metadata associated with the host file system objects that are intended to be shared with external clients. The database may be maintained by the file sharing host 160 and may, in various illustrative examples, fully or partially reside on the file sharing host 160 and/or in the example cloud environment 100 (e.g., on the database server 150). In an illustrative example, the database may maintain a hierarchical data structure comprising the metadata associated with one or more directories and their respective files residing on the host file system. In various illustrative examples, the database may be implemented as a relational database, a hierarchical database, a NoSQL database, etc.

FIG. 2 schematically illustrates an example structure of the database 200 that may be employed for storing the metadata associated with the host file system objects, in accordance with one or more aspects of the present disclosure. For every file system object, the database 200 may store an associated record 210 which may map the file system object identifier 220 to the fully-qualified path 230 to the object within the host file system. In certain implementations, the record 210 may further comprise access rights field 240 specifying users and/or user groups that are authorized to access the file system object for performing certain operations, such as read or write operations. The record 210 may further comprise the file access token 250 (such as a hash of the file access password) against which another file access token provided by the client 170 may be validated. The record 210 may further comprise the file size 250, the maximum number of file access operations to be allowed within a certain time period 260, a textual file description 270, and/or other metadata associated with the file.

The example cloud computing environment 100 may also maintain a file sharing host information database 300, which may reside on the file system server 150 of FIG. 1. FIG. 3 schematically illustrates an example structure of the file sharing host information database 300 that may be employed for storing the file sharing host information, in accordance with one or more aspects of the present disclosure. In the illustrative example of FIG. 3, for each file sharing host 160, the database 300 may store an associated file sharing host information record 310 mapping the file sharing host identifier 320 to the file sharing host login credentials 330 (such as the file sharing host user identifier). In an illustrative example, the file sharing host login credentials may further comprise a hash of the user password that may be used for authenticating the file sharing host user. Alternatively, the user directory server 130 and/or authentication server 140 may be employed for authenticating the file sharing host users.

In certain implementations, the file sharing host information record 310 may further comprise one or more fields describing the state of the file sharing proxy server connection with the file sharing host, such as the connection state 340, and the session identifier 350. The connection state 340 may indicate whether the connection is operational or needs to be re-established (e.g., due to the file sharing host being powered off or in the sleeping mode). The session identifier 350 may be represented by an UUID that may be generated by the file sharing proxy server responsive to establishing the session.

In certain implementations, additional techniques may be used to improve various aspects of the file sharing services. In an illustrative example, the file sharing host information record 310 may further comprise one or more fields describing the file sharing host availability (e.g., during certain times of the day and/or days of the week). In another illustrative example, the file sharing host information record 310 may further comprise one or more fields describing the quality of service levels for the file sharing, which may be defined by the network bandwidth which may be available to the file sharing host during various times.

In certain implementations, the file sharing host information record 310 may further comprise one or more fields containing the user information 360, such as the preferred contact method, the electronic mail address, the phone number, etc. for the file sharing host connection recovery or activation, as described in more details herein below. Alternatively, the above referenced and other information associated with the file sharing host users may be stored by the user directory 130 of FIG. 1.

In various illustrative examples, more than one set of host login credentials 330 may be defined for a given file sharing host; more than one session may be established by a file sharing proxy server with a given file sharing host; and/or more than one user may be associated with a given file sharing host by a data field 360. Such situations may be reflected by creating, in table 300, multiple records for such a file sharing host. Furthermore, in certain implementations, the table 300 may be represented by two or more normalized tables, where each normalized table may comprise a subset of fields of the table 300 shown in FIG. 3 and described herein above.

In certain implementations, the user information stored by the database 300 and/or the user directory 130 may be employed for prompting the file sharing host user to power on the file sharing host 160 and/or establish an Internet connection by the file sharing host 160 in order to make file sharing host files accessible by one or more users of client computing devices 170. In an illustrative example, responsive to determining that the connection state (e.g., represented by a connection state flag) 340 indicates that the associated file sharing host has lost its connection with the file sharing proxy server 110, the cloud infrastructure broker 115 may initiate a connection recovery procedure with respect to the file sharing host 160. The connection recovery procedure may involve an automated voice call and/or a text message to the phone number specified in the file sharing host record 310, to prompt a user of the file sharing host to power the device on and/or establish a management connection with the file sharing proxy.

In certain implementations, the file sharing host information record 310 may further comprise one or more fields describing the configuration of one or more home networks (e.g., local area networks or wireless networks) of the file sharing host. The information may be utilized by the file sharing proxy server for awakening a sleeping file sharing host by one or more active peers or other active devices in the local area network or in a close proximity of the file sharing host. The file sharing proxy server may cause an active device residing on the home network of the file sharing host to transmit an awakening command to the sleeping file sharing host. In certain implementations, the file sharing proxy server may utilize Wake on Demand or Bonjour Sleep Proxy technologies for awakening a sleeping file sharing host.

Referring back to FIG. 1, as noted herein above, file transfer operations by file sharing hosts 160 to clients 170 may be facilitated by various components of the cloud computing environment 100. In particular, the file sharing proxy server 110 may facilitate the data transfer between the file sharing hosts 160 and clients 170 irrespectively of the type of the network connection supported by a given file sharing host 160. The file sharing proxy server 110 has a public IP address and thus may be accessed by the client computing devices 170 via the Internet. In certain implementations, the file sharing proxy server 110 may have a PKI certificate, and thus may establish SSL connections with the client computing devices 170, as described in more details herein below.

Operations of a file sharing host 160 may be facilitated by a file sharing software module operating in accordance with one or more aspects of the present disclosure. In an illustrative example, an authorized user may use a graphical user interface of the file sharing host 160 to select one or more files and/or directories residing in the file sharing host file system for sharing with users of client computing devices 170. The file sharing host user may then specify one or more users and/or user groups that are allowed to access the selected file systems objects, and the associated access rights (e.g., read and/or write). The file sharing host may transmit the identifiers and the metadata associated with the selected file system objects to the cloud infrastructure broker 155, which may store the received metadata in a file information database residing on the database server 150.

In order to allow client computing devices 170 to securely access the selected file sharing host files, the file sharing host 160 may establish a secure connection (e.g., an SSL connection) with the file sharing proxy server 110. The connection may be kept alive indefinitely or for at least a certain period of time, in anticipation of client requests for files residing in the file sharing host file system. A client computing device 170 may, in turn, establish an SSL connection with the file sharing proxy server 110 and transmit one or more file access requests (e.g., using one or more hyperlinks associated with the file system objects, as described in more details herein above).

The two SSL connections may be utilized for transmitting the files from the file sharing host to the file sharing proxy server, and then to the client computing device. In accordance with one or more aspects of the present disclosure, the file sharing proxy server may "short circuit" the sockets associated with file sharing host and client connections, by writing to the socket associated with the client connection all data that has been read from the socket associated with the host connection, and vice versa. The file sharing proxy server may, responsive to receiving a client request, establish a secure client connection with the requesting client computing device. The file sharing proxy server may then transmit, over a previously established management connection to the file sharing host, one or more parameters of a secure client connection (e.g., the SSL session key which is used for encrypting the traffic flowing over the SSL connection and/or other elements of the SSL connection state). The file sharing host may utilize the received secure connection parameters, including the SSL session key, for establishing a new SSL connection with the file sharing proxy server, thus enabling the existing client connection and the newly established host connection to share the SSL session key and/or other elements of the SSL connection state. Since the same SSL session key is shared by both client and host connections to the file sharing proxy server, the traffic flowing over both connections may be encrypted by the same encryption key, and the client computing device may decrypt the messages transmitted by the file sharing host, while the file sharing host may decrypt the messages transmitted by the client computing device, thus relieving the file sharing proxy server from the task of decrypting the data received over one connection and re-encrypting the data before forwarding it over another connection.

Figure 4:
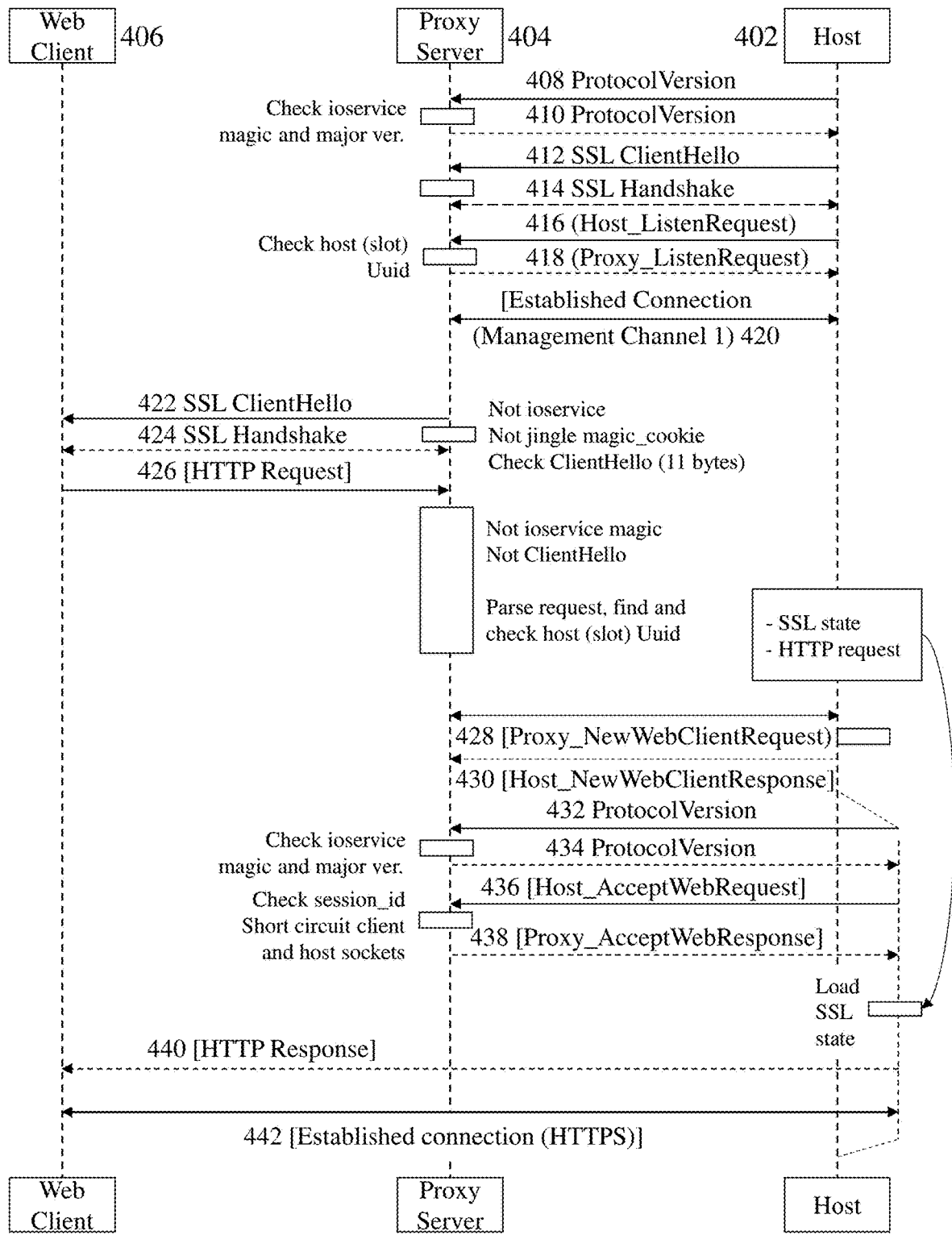
FIG. 4 schematically illustrates a sequence diagram 400 for file sharing over secure connections, in accordance with one or more aspects of the present disclosure.

FIG. 4 schematically illustrates a sequence diagram 400 for file sharing over secure connections, in accordance with one or more aspects of the present disclosure. As schematically illustrated by FIG. 4, a file sharing host 402 (corresponding to the file sharing host 160 of FIG. 1) may establish a management connection with a file sharing proxy server 404 (corresponding to the file sharing proxy server 110 of FIG. 1). In certain implementations, the management connection establishment may be preceded by the cloud infrastructure broker authorizing the file sharing host and advising the file sharing host and the file sharing proxy server of each other's identifiers. Upon establishing an unsecure connection with the file sharing proxy server, the file sharing host may transmit a connection request message (e.g., Protocol Version message) (408) to the file sharing proxy server. Upon validating the protocol identifier and version (provided by text strings or arbitrary byte sequences) specified by the message, the file sharing proxy server may respond by transmitting an identical Protocol Version message (410) to the file sharing host. Upon receiving the response Protocol Version message (410), the file sharing host may initiate an SSL handshake (414) with the file sharing proxy server by transmitting an SSL Hello message (412).

Upon establishing the SSL connection, the file sharing host may transmit a management connection request message (e.g., Host_ListenRequest message) (416) specifying the file sharing host identifier (e.g., the UUID associated with the file sharing host). Upon validating the file sharing host identifier, the file sharing proxy server may respond with a management connection confirmation (e.g., Proxy_ListenResponse message) (418), thus finalizing the establishment of the management connection (420). The management connection may be kept alive indefinitely or for at least a certain period of time, in anticipation of client requests for files residing in the file sharing host file system. In certain implementations, the file sharing proxy server and the file sharing host may exchange periodic heartbeat messages to validate the connection status.

Independently of the above-described sequence, a client computing device 406 (corresponding to the client computing device 170 of FIG. 1) may establish a browser-based session with the file sharing proxy server. The client computing device may initiate an SSL handshake (424) with the file sharing proxy server by transmitting an SSL Hello message (422). Upon establishing the SSL connection, the client computing device may transmit an HTTP request (426) encoding a file access request with respect to a file identified by a URL, as described in more details herein above.

Upon receiving the HTTP request (426), the file sharing proxy server may retrieve and parse the URL to identify the file sharing host on which the requested file resides. Responsive to determining that a management connection with the file sharing host exists, the file sharing proxy server may transmit a client request message (e.g., Proxy_NewWebClientRequest message) (428) over the identified management connection to the file sharing host. The message (428) may comprise at least part of the HTTP request (426), the client session UUID (session_uid), and certain other elements of the SSL connection state, including the selected cipher type, the master key, the SSL session identifier, and/or initialization vector values.

Responsive to receiving the message (428), the file sharing host may respond by transmitting a client request acknowledgement message (e.g., Host_NewWebClientResponse) (430). The file sharing host may then establish a new unsecured connection with the file sharing proxy server by transmitting a connection request (e.g., ProtocolVersion message) (432). Upon receiving the ProtocolVersion response (434), the file sharing host may transmit a file sharing host ready message (e.g., Host_AcceptWebRequest message) (436) indicating that the file sharing host is ready to serve its files to the requesting client. The Host_AcceptWebRequest message (436) may comprise the client session UUID that was previously transmitted by the file sharing proxy server, so that the file sharing proxy server would be able to associate the Host_AcceptWebRequest message (436) with the previously transmitted Proxy_NewWebClientRequest message (428), and thus identify the requesting client and the associated client session.

The file sharing proxy server may respond to the Host_AcceptWebRequest message (436) by transmitting a confirmation (e.g., Proxy_AcceptWebResponse message) (438), upon receiving which the file sharing host may initialize an SSL session over the existing unsecure connection with the file sharing proxy server. In establishing the SSL session, the file sharing host may utilize the SSL state elements (such as the SSL session key which is used for encrypting the traffic flowing over the SSL connection) corresponding to the client session identified by the client session UUID that was transmitted by the file sharing host as part of the Host_AcceptWebRequest message (436). From that point on, the existing client connection and the newly established host connection share the SSL session key and other elements of the SSL connection state. Hence, the client computing device may decrypt the messages transmitted by the file sharing host, and the file sharing host may decrypt the messages transmitted by the client computing device, relieving the file sharing proxy server from the task of decrypting the data received over one connection and re-encrypting the data before forwarding it over another connection. The file sharing host may thus receive the HTTP request message (426) and respond by transmitting the requested file over the established secure connection (442).

Figure 5:
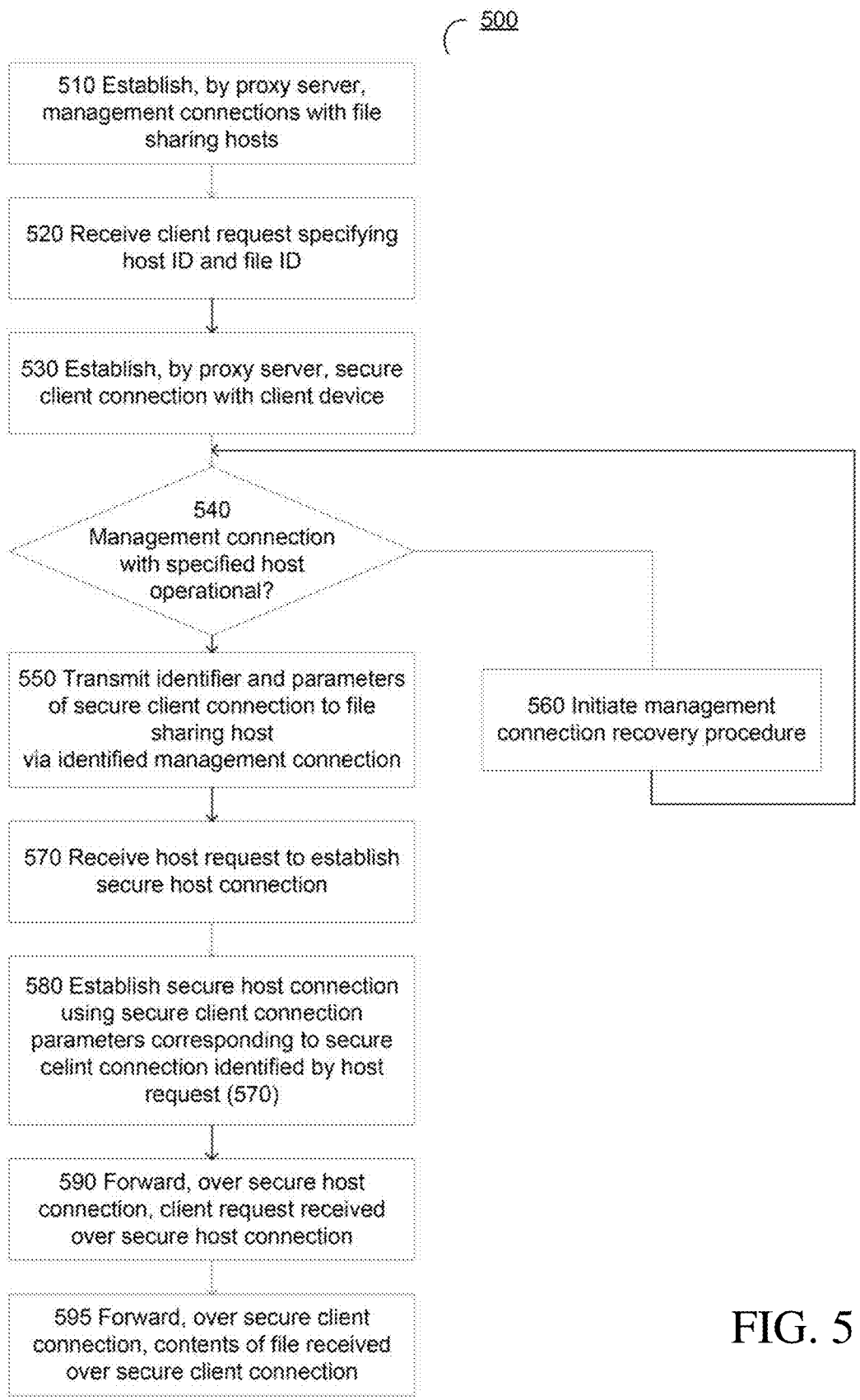
FIG. 5 depicts a flow diagram of a method of file sharing over secure connections that may be performed by a file sharing proxy server operating in accordance with one or more aspects of the present disclosure.

FIG. 5 depicts a flow diagram of one illustrative example of method 500 of file sharing over secure connections that may be implemented by a file sharing proxy server operating in accordance with one or more aspects of the present disclosure. Method 500 and/or each of its individual functions, routines, subroutines, or operations may be performed by one or more processing devices of the computer system (e.g., the file sharing proxy server 110 of FIG. 1) implementing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. In various illustrative examples, at least some of the operations described herein as being performed by the file sharing proxy, may be performed by other components of the example cloud computing environment 100.

At block 510, a processing device implementing the method may establish management connections with a plurality of file sharing hosts. Each management connection may be established responsive to receiving a connection request from the respective file sharing host, as described in more details herein above. In certain implementations, establishing the management connection with the file sharing host may involve validating an application-level protocol identifier supplied by the file sharing host. Additionally or alternatively, establishing the management connection with the file sharing host may involve authenticating the file sharing host using the authentication credentials (e.g., a user identifier and a password) transmitted as by the host connection request, as described in more details herein above.

In an illustrative example, a file sharing host may be authenticated using a cryptographic certificate which may be issued to the file sharing host 160 by the cloud infrastructure broker 115 or by another trusted component of the example cloud computing environment 100. The certificate may identify, e.g., by providing an electronic mail address, an authorized user associated with the file sharing host 160. Establishing the management connection may involve performing the SSL handshake (as described herein above with reference to item 414 of FIG. 4), during which the file sharing proxy server 110 may request the file sharing host 160 to provide its cryptographic certificate. The file sharing proxy server 110 may then, responsive to receiving the management connection request message (as described herein above with reference to item 416 of FIG. 4), validate the received cryptographic certificate, e.g., by validating the electronic signature of the issuing certificate authority (CA). The file sharing proxy server 110 may further verify, using the information received from the cloud infrastructure broker 115 and/or other trusted component of the example computing environment 100, that the user identified by the received certificate is in fact authorized to operate the file sharing host.

Responsive to establishing a management connection with a file sharing host, the file sharing proxy server may receive, over a management connection, one or more file sharing requests transmitted by the respective file sharing host. Alternatively, the file sharing requests may be received over other types of secure connections. Each file sharing request may include identifiers of one or more files residing on the file system associated with the file sharing host and identifiers of one or more file sharing clients authorized to access each file. Responsive to receiving each file sharing request, the file sharing proxy server may associate each file identifier with the respective host identifier and construct a hyperlink including the URL of the file sharing proxy server, the file sharing host identifier, and the file identifier. The file sharing proxy server may further create a new record in the database 200 of FIG. 2, to associate the file identifier (e.g., represented by an UUID) with the fully-qualified path within the host file system. In certain implementations, the database record may further comprise access rights field 240 specifying users and/or user groups that are authorized to access the file for performing certain operations, such as read or write operations, as described in more details herein above.

At block 520, the processing device may receive a client request from a client computing device. The client request may specify an identifier of a file sharing host and an identifier of a file that is stored on a file system associated with the file sharing host, as described in more details herein above.

At block 530, the processing device may establish a secure client connection with the requesting client computing device. In an illustrative example, the secure client connection may be provided by an SSL connection. In certain implementations, establishing the secure client connection may involve authenticating the client using the authentication credentials (e.g., a user identifier and a password) transmitted by the client connection request, as described in more details herein above. Alternatively, the file sharing proxy may accept the client request without authenticating the client, in which case the client authentication may be performed at a later stage by the file sharing host responsive to receiving the client request forwarded by the file sharing proxy server.

Responsive to identifying, at block 540, a management connection associated with the file sharing host specified by the client request, the processing device may, at block 550, utilize the identified management connection for transmitting, to the file sharing host, an identifier of the secure client connection (e.g., client session UUID) that has been established at block 530, as well as and one or more parameters of the same secure client connection. In certain implementations, the secure client connection parameters may comprise one or more SSL session state elements, including the selected cipher type, the session identifier, the session key, and/or initialization vector values, as described in more details herein above.

Should the processing device fail to identify, at block 540, a management connection associated with the file sharing host specified by the client request, the method may branch to block 560, where the processing device may initiate a connection recovery procedure with respect to the file sharing host. The connection recovery procedure may involve an automated voice call and/or a text message to the phone number specified in the file sharing host record, to prompt a user of the file sharing host to power the device on and/or establish a management connection with the file sharing proxy. The method may then loop back to block 540.

At block 570, the processing device may receive a host request originated by the file sharing host requesting to establish a secure host connection with the file sharing proxy server. The host request may comprise an identifier of the secure client connection that was previously transmitted to the file sharing host by the proxy server at block 550.

At block 580, the processing device may establish a secure host connection using the secure client connection parameters associated with the secure client connection identified by the host request. This will result in the existing client connection and the newly established host connection sharing the SSL session key and/or other elements of the SSL connection state. Since the same SSL session key is shared by both client and host connections to the file sharing proxy server, the traffic flowing over both connections may be encrypted by the same encryption key, and the client computing device may to decrypt the messages transmitted by the file sharing host, while the file sharing host may to decrypt the messages transmitted by the client computing device.

At block 590, the processing device may forward, over the secure host connection, a data packet received over the secure client connection. The data packet may comprise at least part of an HTTP request identifying a file residing on the file sharing host file system, as described in more details herein above.

At block 595, the processing device may forward, over the secure client connection, a data packet received over the secure host connection. The data packet may comprise at least part of the contents of the requested file, as described in more details herein above.

Figure 6:
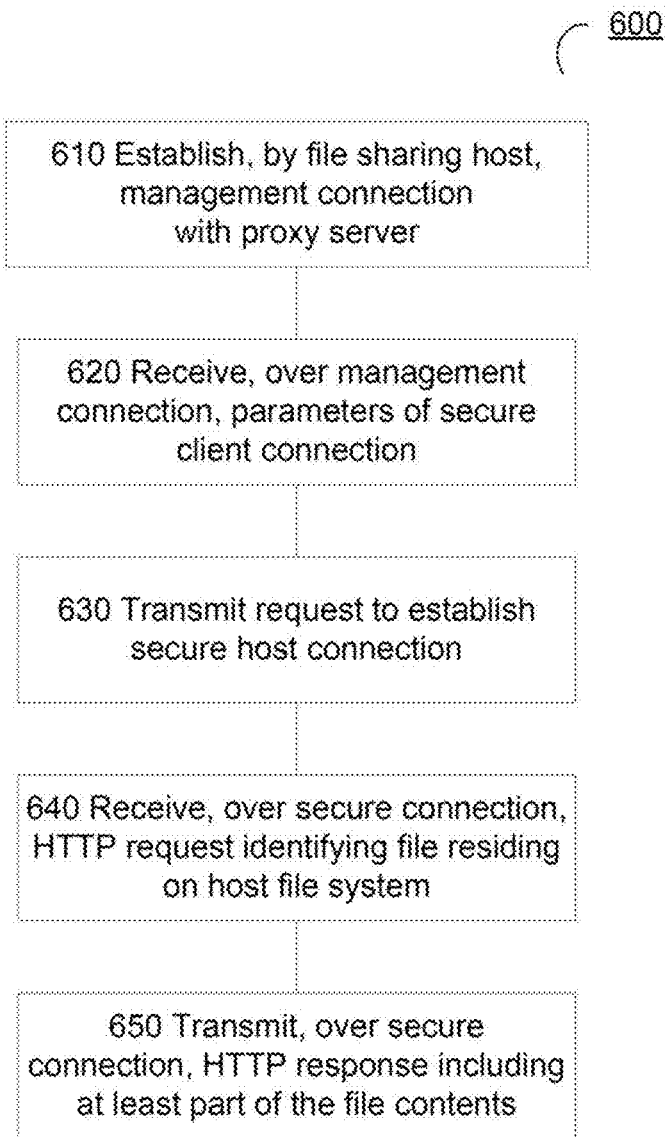
FIG. 6 depicts a flow diagram of a method of file sharing over secure connections that may be performed by a file sharing host operating in accordance with one or more aspects of the present disclosure.

FIG. 6 depicts a flow diagram of one illustrative example of method 600 of file sharing over secure connections that may be implemented by a file sharing host operating in accordance with one or more aspects of the present disclosure. Method 600 and/or each of its individual functions, routines, subroutines, or operations may be performed by one or more processing devices of the computer system (e.g., the file sharing host 160 of FIG. 1) implementing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other.

At block 610, a processing device implementing the method may establish a management connection with a file sharing proxy server. Establishing the management connection may involve transmitting, to the file sharing proxy server, a management connection request including a protocol identifier and/or file sharing host authentication credentials (e.g., a user identifier and a password), as described in more details herein above.

At block 620, the processing device may receive, over the management connection, an identifier and one or more parameters of the file sharing proxy server's secure connection with a requesting client. In an illustrative example, the secure client connection may be provided by an SSL connection. In certain implementations, the secure client connection state parameters may include the secure client connection parameters which may comprise one or more SSL session state elements, including the selected cipher type, the SSL session identifier, the session key, and/or initialization vector values.

At block 630, the processing device may transmit, to the file sharing proxy server, a request to establish a secure host connection. The request may comprise the identifier of the secure client connection that has been received from the file sharing proxy server at block 620. Thus, the existing proxy to client connection and the newly established proxy to host connection may share the SSL session key and/or other elements of the SSL connection state. Since the same SSL session key is shared by both client and host connections to the file sharing proxy server, the traffic flowing over both connections may be encrypted by the same encryption key, and the file sharing host may decrypt the messages transmitted by the client computing device.

At block 640, the processing device may receive, over the established secure host connection, an HTTP request identifying a file residing on the file sharing host file system, as described in more details herein above.

At block 650, the processing device may transmit an HTTP response including at least part of the contents of the requested file, as described in more details herein above.

Figure 7:
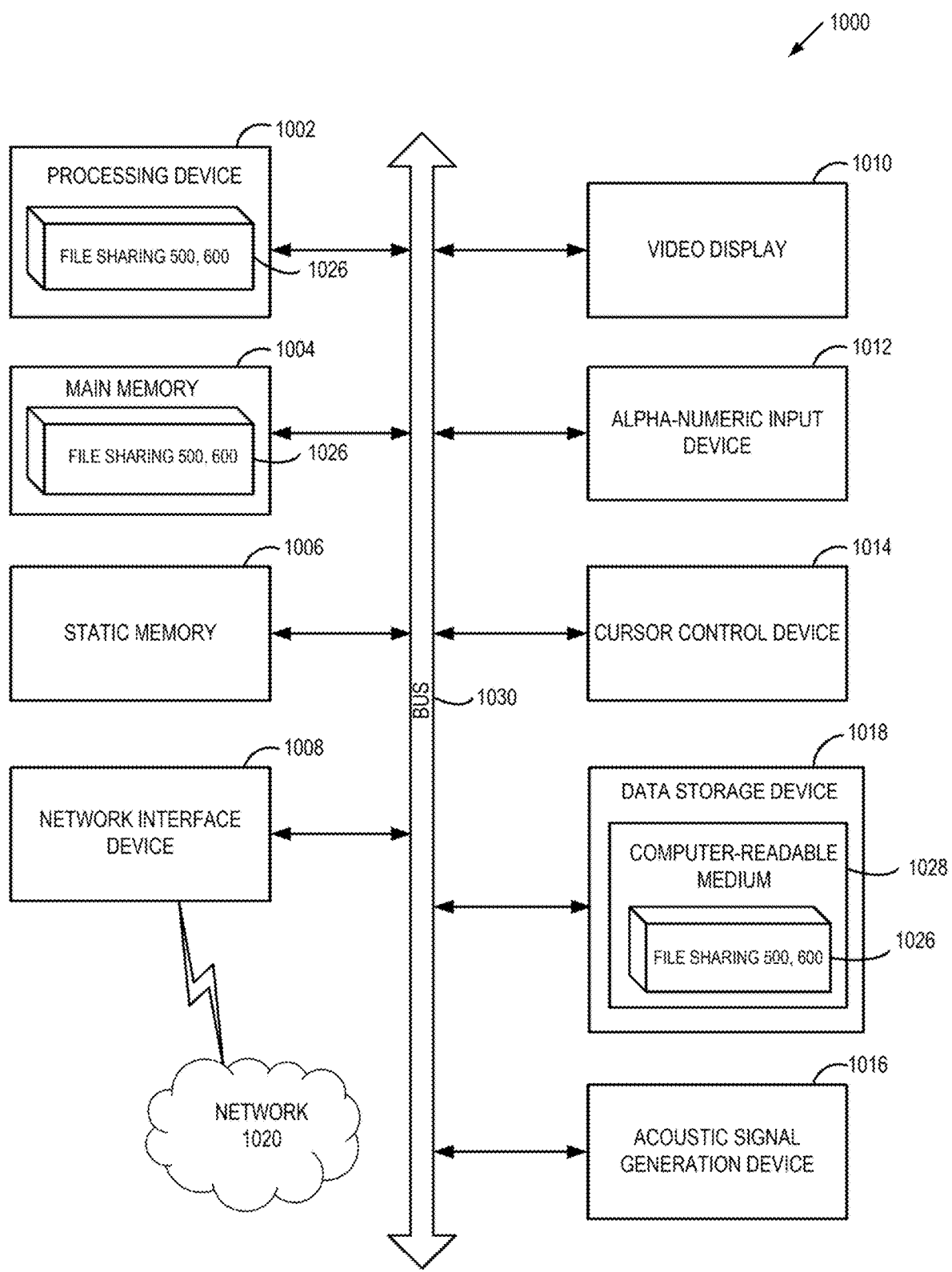
FIG. 7 depicts a block diagram of an example computer system operating in accordance with one or more aspects of the present disclosure.

FIG. 7 schematically illustrates a component diagram of an example computer system 1000 which may perform any one or more of the methods described herein. In various illustrative examples, computer system 1000 may represent a file sharing proxy server 110, a cloud infrastructure broker 115, a directory server 130, an authentication server 140, a database server 150, or a file sharing host 160, or a client computing device 170 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing methods 500 and/or 600 for file sharing over secure connections.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of methods 500 and/or 600 for file sharing over secure connections.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 7 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
transmitting from a file sharing host of a plurality of file sharing hosts to a client computing device via a file sharing proxy server a file; wherein
the file is initially transmitted to the file sharing proxy server from the file sharing host of the plurality of file sharing hosts over a first secure connection;
the file is then transmitted from the file sharing proxy server to the client computing device over a second secure connection;
the file sharing proxy server determines whether data received over the first secure connection from the file sharing host of the plurality of file sharing hosts is encrypted and intended for the client computing device and upon a positive determination directly forwards the received data to the client computing device over the second secure connection without decrypting the received data and re-encrypting it for transmission;
the file sharing host of the plurality of file sharing hosts was identified as being an active storage location of the file by a file sharing proxy server through a process comprising the steps of:
parsing the resource locator to identify the file;
identifying a subset of the plurality of file sharing hosts storing the file in dependence upon parsing a database accessible to the file sharing proxy server storing metadata relating to file system objects stored by each of the plurality of file sharing hosts to match the file to these file system objects;
identifying an active file sharing host of the subset of the plurality of file sharing hosts in dependence upon parsing another database accessible to the file sharing proxy server storing one or more fields describing availability of each file sharing host of the plurality of file sharing hosts where the active file sharing host is currently available; and
establishing the active file sharing host as the file sharing host of the plurality of file sharing hosts.

2. A method comprising:
transmitting from a file sharing host of a plurality of file sharing hosts to a client computing device via a file sharing proxy server a file; wherein
the file is initially transmitted to the file sharing proxy server from the file sharing host of the plurality of file sharing hosts over a first secure connection;
the file is then transmitted from the file sharing proxy server to the client computing device over a second secure connection;
the file sharing proxy server determines whether data received over the first secure connection from the file sharing host of the plurality of file sharing hosts is encrypted and intended for the client computing device and upon a positive determination directly forwards the received data to the client computing device over the second secure connection without decrypting the received data and re-encrypting it for transmission; wherein
the file sharing host of the plurality of file sharing hosts was identified as being an active storage location of the file by a file sharing proxy server through a process comprising the steps of:
parsing the resource locator to identify the file;
identifying a subset of the plurality of file sharing hosts storing the file in dependence upon parsing a database accessible to the file sharing proxy server storing metadata relating to file system objects stored by each of the plurality of file sharing hosts to match the file to these file system objects;
selecting the file sharing host of the plurality of file sharing hosts from subset of the plurality of file sharing hosts; and establishing a status of the file sharing host of the plurality of file sharing hosts in dependence upon parsing another database accessible to the file sharing proxy server storing one or more fields describing availability of the file sharing host of the plurality of file sharing hosts;

upon establishing the status of the file sharing host of the plurality of file sharing hosts as active the file sharing proxy server executes another process in conjunction with the file sharing host of the plurality of file sharing hosts to establish the first secure connection.

3. A method comprising:

transmitting from a file sharing host of a plurality of file sharing hosts to a client computing device via a file sharing proxy server a file; wherein the file is initially transmitted to the file sharing proxy server from the file sharing host of the plurality of file sharing hosts over a first secure connection;

the file is then transmitted from the file sharing proxy server to the client computing device over a second secure connection;

the file sharing proxy server determines whether data received over the first secure connection from the file sharing host of the plurality of file sharing hosts is encrypted and intended for the client computing device and upon a positive determination directly forwards the received data to the client computing device over the second secure connection without decrypting the received data and re-encrypting it for transmission; wherein the file sharing host of the plurality of file sharing hosts was identified as being an active storage location of the file by a file sharing proxy server through a process comprising the steps of:

parsing the resource locator to identify the file;

identifying a subset of the plurality of file sharing hosts storing the file in dependence upon parsing a database accessible to the file sharing proxy server storing metadata relating to file system objects stored by each of the plurality of file sharing hosts to match the file to these file system objects;

selecting the file sharing host of the plurality of file sharing hosts from subset of the plurality of file sharing hosts; and establishing a status of the file sharing host of the plurality of file sharing hosts in dependence upon parsing another database accessible to the file sharing proxy server storing one or more fields describing availability of the file sharing host of the plurality of file sharing hosts;

upon establishing the status of the file sharing host of the plurality of file sharing hosts as not active the file sharing proxy server executes a further process comprising the steps of:

retrieving data from a file sharing host information record from the another database associated with the file sharing host of the plurality of file sharing hosts; and employing the data to cause an awakening of the file sharing host of the plurality of file sharing hosts by at least one of an active peer of the file sharing host of the plurality of file sharing hosts, an active device in a home network with the file sharing host of the plurality of file sharing hosts forms, and an active device in close proximity of the file sharing host of the plurality of file sharing host; and the file sharing host information record comprises one or more fields describing the configuration of the home network where the home network is at least one of a local area network or a wireless network.

4. The method according to claim 3, further comprising upon establishing the status of the file sharing host of the plurality of file sharing hosts as active the file sharing proxy server executes another process in conjunction with the file sharing host of the plurality of file sharing hosts to establish the first secure connection.

\* \* \* \* \*